Patented July 13, 1943

2,324,119

UNITED STATES PATENT OFFICE 2,324,119

BONDED SILICON CARBIDE REFRACTORY

John P. Swentzel, Niagara Falls, N. Y., assignor to The Carborundum Company, Niagara Falls, N. Y., a corporation of Delaware No Drawing. Application September 25, 1940, Serial No. 358,339

14 Claims. (Cl. 106—44)

This invention relates to silicon carbide compositions and to methods of forming them. More particularly it relates to bonded silicon carbide refractory shapes made from such compositions, which shapes not only possess high thermal conductivity and strength at elevated temperatures, but also are especially resistant to oxidation under severe oxidizing conditions.

Failure of silicon carbide refractories is manifested in many different ways depending upon the type of bond, size of granules and methods of manufacture and use. For example, certain bonded silicon carbide refractories show an increase in volume often amounting to as much as 10% or more and become soft and weak without cracking whereas others crack and distort badly with a relatively small increase in volume. Still others show readily discernible expansion with but little increase in weight while some gain considerably in weight before expansion takes place. However, an increase in weight is generally an indication of approaching failure of the refractory, as slight as 3-5% gain often occurring before the refractory becomes useless.

This increase in weight and/or volume of silicon carbide refractories is best explained by the fact that silicon carbide having a molecular weight of 40, in undergoing oxidation, is transformed to silica having a molecular weight of 60. In other words for every gram of silicon carbide in the original article which becomes oxidized there is produced 1.5 grams of silica. The silica formed is usually cristobalite with a density of 2.32 as compared to a density of 3.17 for silicon carbide, which further explains the increase in volume and accounts for the failure of originally dense refractories due to expansion and disruption. The destruction of such refractories which have developed a high silica content is hastened by the inversion of the silica from one crystal form to another as it passes through specific fairly low temperature ranges. Further, the high thermal conductivity and spalling resistance which are two of the most valuable physical properties of bonded silicon carbide refractories decrease as the silicon carbide is converted to silica.

Regardless of how such failures are manifested it is believed that most, if not all, silicon carbide refractory bodies ultimately fail due to oxidation of the silicon carbide to silica. In some cases silicon carbide refractories have failed due to oxidation even in so-called reducing atmospheres. In fact, it is considered by some authorities that alternating reducing and oxidizing atmospheres are more destructive from an oxidation standpoint than a consistently oxidizing atmosphere because of the effect of such fluctuations in conditions in preventing the formation of any protection for the silicon carbide granules or in destroying such protective coatings after they have formed.

Heretofore all efforts to produce a bond for silicon carbide articles which would be extremely oxidation resistant and also would retain a high strength at elevated temperatures have been unsuccessful. Clays and other ingredients producing bonds of the porcelain type have resulted in bodies which have had good hot strength, but which were not sufficiently oxidation resistant to give a satisfactory life. Other silicon carbide bodies using bonds of a glassy nature have been fairly resistant to oxidation only to fail at operating temperatures because of softening of the glass bond and loss of strength. Attempts to retard oxidation by application of various glazes to the formed article have similarly not been entirely successful because of the temporary character of the glaze and exposure of the silicon carbide granules to direct oxidizing influences after the glaze has been destroyed.

Other silicon carbide refractories have been made in which hydrates, such as calcium hydrate, have been incorporated in the raw batch as a bond. Although such hydrate-bonded articles have resulted in dense products of fairly good strength they have not shown the oxidation resistance at high temperatures essential to long life under severe oxidizing conditions.

It is an object of the present invention to provide an improved silicon carbide body which is highly resistant to oxidation in use, and at the same time stands up under heavy loads at high temperatures.

In accordance with the present invention, the silicon carbide grains are held together by a bonding composition in which a barium compound constitutes an essential and important ingredient. It has been found effective to add the barium to the raw batch in the form of a salt of barium, for example, barium carbonate. The addition of 0.5 to 10% of such a barium compound to a raw batch of silicon carbide grain has yielded beneficial results in the making of standard 4½ x 2½ x 9" bricks as well as thinner shapes such as large flat kiln tiles and the like.

The following example is given of a mix according to the present invention used for the making of standard size refractory brick:

|  | Parts by weight |
|---|---|
| 14 and finer silicon carbide grain | 93 |
| Powdered silicon carbide | 7 |
| Barium carbonate | 3 |
| Dry lignone | 3 |

The silicon carbide grain is selected in a gradation of grit sizes such as to produce a maximum density. The barium carbonate used is in finely divided form. In mixing the various ingredients the finely divided barium carbonate is thoroughly mixed in the dry condition with the fine fraction of silicon carbide and the dry temporary binder, after which it is mixed with the coarser fractions of silicon carbide grain in dry state, followed by mixing wet in an ordinary kneader mixer, sufficient water being added to bring the batch to a pressing consistency. The bricks are then formed as for example by pressing on a hydraulic press at pressures above 5000 pounds per square inch. The shaped articles are then dried in the usual manner at 220° F. and finally fired in a kiln at 1450° C.

The silicon carbide used is a pure grade of grain showing by analysis over 96% silicon carbide, with less than 2% each of iron oxide and aluminum oxide, and only traces of such impurities as calcium oxide, sodium oxide, potassium oxide, etc., any remainder being silica. It has been found desirable to incorporate small amounts of finely divided silicon carbide as a bonding ingredient as it helps to provide a denser final product and appears to more readily unite with the barium compound to improve the strength of oxidation resistance of the fired article. This is somewhat unexpected since finely divided silicon carbide usually oxidizes rapidly due to the greatly increased surfaces exposed to oxidizing influence. Good results have been obtained with those compositions in which no clay is included in the batch, the bonding strength being dependent solely upon the interstitial material or reaction products formed by interaction of the barium constituent and the impurities and/or oxidation products of the silicon carbide itself.

Other salts of barium which serve the purpose include barium nitrate, barium chloride, barium sulphate, barium fluoride and barium silicofluoride. The oxide or hydroxide (sometimes called hydrate) of barium, although of some value in the above capacity as bonding materials, do not improve the refractory's oxidation resistive properties to any extent comparable to that of the various salts enumerated. This is not completely understandable since it would be reasonable to expect that the salts recommended for use would normally break down to ultimately yield the oxide. However, apparently some difference in the melting points or some preliminary reaction which the salts undergo is instrumental in promoting a more thorough and uniform dispersion of the barium throughout the body of the article and around each of the individual particles of silicon carbide, whereby the barium is in a state conducive to reaction with the silicon carbide, at least with that portion of it which is oxidized during burning, so that upon exposure of the refractory to external atmospheres of an oxdizing nature during use at high temperatures the barium salt readily unites with some other component of the refractory to yield a protective glass or glaze which shields the silicon carbide particles effectively from further attack.

It might be expected that like improvement in bond could be obtained by use of calcium compounds since calcium is similar to barium in that both are members of the alkaline earth group. However, such has been found not to be the case, the present improvement for some as yet unexplained reason, being peculiar to compounds of barium.

Barium bonded articles made according to the above procedure exhibit a marked superiority over standard high grade silicon carbide refractory articles. When exposed to severe oxidizing conditions the barium bonded pieces gain less weight than any other silicon carbide refractories which have been exposed to identical conditions. Subjection of the refractory shapes of the present invention to heavy loads while hot have shown that they retain their cold strength to a considerable degree when heated to high temperatures.

The fractured surfaces of broken barium bonded silicon carbide refractory pieces quickly glaze over upon further heating to protect the interior which is a vulnerable section of most silicon carbide refractories. The glazed surface or coating so formed improves or becomes more glasslike or glazed in appearance the longer it remains in the furnace, whereas fractured faces of other types of bonded silicon carbide bodies, if originally glazed, soon lose their glass-like appearance and become dull, indicating devitrification.

It is quite difficult to offer a good theory as to why the bonds so formed containing barium salts should result in a glaze-forming bond which is so superior in protective qualities and durability, as well as of high strength both hot and cold. It is believed that the impurities of silica, iron, alumina, etc. in the refractory grain as well as the silica formed in situ by the oxidation of a small portion of the silicon carbide grain itself during the carbonizing period in the original firng go into soluton with the barium salts to protect the silicon carbide from oxidation. It is possible that by placing the barium in the mix in the form of a decomposable salt containing an acid radical, a breakdown into its components accompanied by a reaction with other oxidized constituents of the fired article promotes its dispersion throughout the body of the object more efficiently than if an inert form of barium such as the oxide were originally used, and therefore the barium salt more effectively comes in contact with and coats the particles of silicon carbide. In other words, the barium oxide formed by breakdown of barium carbonate, or barium from breakdown of barium chloride, may be in a very finely divided, nascent, reactive state which would not be the result if the barium oxide were used in the beginning. It is known from observation that the barium containing bonds develop a barium glass or glaze which for lack of more adequate information we shall refer to in the claims as a silicate of barium. This barium-containing compound, whatever its nature is estimated to be, is effective in desired results if present in amounts of from 0.5 to 15%. The fact remains, however, whatever the explanation that barium-containing bonds as set forth herein produce a superior silicon carbide refractory especially in regard to oxidation resistance.

Having thus described the invention in a clear and operable manner, it is desired to claim:

1. A bonded silicon carbide refractory article comprising 0.5 to 10% of a barium salt distributed uniformly throughout the body of said article.

2. As a new article of manufacture a refractory shape consisting essentially of silicon carbide and oxidation products thereof and containing a small amount of a barium salt distributed uniformly throughout the body of said article.

3. As a new article of manufacture a refractory shape consisting essentially of silicon carbide and oxidation products thereof together with 0.5 to 15% of barium silicate distributed uniformly throughout the body of said article.

4. As a new article of manufacture a refractory shape consisting essentially of silicon carbide and oxidation products thereof together with 0.5 to 10% of a barium salt distributed uniformly throughout the body of said article.

5. As a bond for silicon carbide refractory articles an intimate mixture of finely powdered silicon carbide and barium carbonate.

6. A bonded silicon carbide refractory, the bond of which comprises finely divided silicon carbide and a barium salt distributed uniformly throughout the body of said article.

7. A bonded silicon carbide refractory article having an oxidation-resistant glaze-forming bond distributed uniformly throughout the body of said article, said bond comprising a salt of barium.

8. A bonded silicon carbide refractory article, the bond of which comprises an oxidation- resistant glaze-forming bond composed largely of a barium silicate distributed throughout the body of the article.

9. A bonded silicon carbide refractory article, the silicon carbide particles thereof being encased and held to one another by an oxidation-resistant glaze-developing bond containing barium and distributed uniformly throughout the body of said article.

10. A bonded silicon carbide refractory article, the silicon carbide particles thereof being encased and held to one another by an oxidation-resistant glaze-developing bond distributed uniformly throughout the body of said article, said bond consisting essentially of barium silicate formed by the combining of a barium compound with the oxidation products of silicon carbide.

11. A silicon carbide refractory article which by chemical analysis is uniformly composed throughout of 80 to 92% silicon carbide, 0 to 2% $Fe_2O_3$, 0 to 2% $Al_2O_3$ and 0.5 to 8% BaO, said minor constituents forming an oxidation-resistant glaze upon exposure to oxidizing influences.

12. A raw batch for the manufacture of silicon carbide articles comprising 0.5 to 10% of barium carbonate.

13. A raw batch for the manufacture of silicon carbide refractory articles comprising silicon carbide grain and an added bond comprising a barium salt, said bond constituting 0.5 to 10% of the batch by weight.

14. In the process of making silicon carbide refractories the steps which comprise forming a mix of silicon carbide grains and a salt of barium, forming an article from said mix, and firing to form a glaze-developing bond throughout the body of said article to protect the silicon carbide grain from oxidation during use at elevated temperatures.

JOHN P. SWENTZEL.